(12) United States Patent
Denman

(10) Patent No.: US 12,202,442 B1
(45) Date of Patent: Jan. 21, 2025

(54) CONVERTIBLE CARRIER RACK AND PLATFORM

(71) Applicant: Crooked Cedar Designs, LLC, Troy, VA (US)

(72) Inventor: Kevin L. Denman, Troy, VA (US)

(73) Assignee: Crooked Cedar Designs, LLC, Troy, VA (US)

( * ) Notice: Subject to any disclaimer, the term of this patent is extended or adjusted under 35 U.S.C. 154(b) by 0 days.

(21) Appl. No.: 18/409,249

(22) Filed: Jan. 10, 2024

Related U.S. Application Data

(63) Continuation of application No. 18/216,176, filed on Jun. 29, 2023, now Pat. No. 11,904,813.

(51) Int. Cl.
*B60R 9/045* (2006.01)
*A47B 3/08* (2006.01)

(52) U.S. Cl.
CPC ............ *B60R 9/045* (2013.01); *A47B 3/0803* (2013.01); *A47B 2003/0824* (2013.01)

(58) Field of Classification Search
CPC ............... B60R 9/045; A47B 3/0803; A47B 2003/0824
See application file for complete search history.

(56) References Cited

U.S. PATENT DOCUMENTS

| | | | | | |
|---|---|---|---|---|---|
| 1,108,326 A | * | 8/1914 | Brown et al. | ........... | A61G 7/015 |
| | | | | | 5/617 |
| 1,109,406 A | * | 9/1914 | Dolge | .................... | A61G 7/015 |
| | | | | | 5/310 |
| 1,530,719 A | * | 3/1925 | Harris | .................. | A61G 13/009 |
| | | | | | 5/613 |
| 2,024,431 A | * | 12/1935 | Corduan | .............. | A47B 3/0916 |
| | | | | | 108/127 |
| 2,546,816 A | * | 3/1951 | Benvissuto | .......... | A47B 3/0815 |
| | | | | | 108/130 |
| 2,708,613 A | * | 5/1955 | Heckman | ................. | A47B 3/02 |
| | | | | | 108/14 |
| 2,721,681 A | * | 10/1955 | Thomas | ................. | A47B 85/06 |
| | | | | | 224/314 |
| 2,831,739 A | * | 10/1955 | Fryckholm | ............ | A47B 91/02 |
| | | | | | 248/188.5 |
| 2,948,576 A | * | 8/1960 | Ball | ....................... | B60R 9/055 |
| | | | | | 312/257.1 |
| 2,965,424 A | | 12/1960 | Baney | | |
| 3,009,615 A | | 11/1961 | Baxter | | |
| 3,028,609 A | | 4/1962 | Tolf | | |
| 3,057,669 A | * | 10/1962 | Rogers | .................... | B60R 9/045 |
| | | | | | 108/11 |

(Continued)

OTHER PUBLICATIONS

International Searching Authority/USPTO, International Search Report and Written Opinion for International Patent Application No. PCT/US2024/034448, Jul. 15, 2024.

*Primary Examiner* — Brian D Nash
(74) *Attorney, Agent, or Firm* — Williams Mullen; Thomas F. Bergert

(57) ABSTRACT

Embodiments of the present disclosure provide a convertible carrier rack and platform including a platform, a front rail including a pair of front rail segments, and a back rail including a pair of back rail segments, wherein the front and back rail segments are each removable and/or rotatable between a wall position along the front and back faces of the platform and a leg position for operation in a table-type mode.

1 Claim, 4 Drawing Sheets

(56) References Cited

U.S. PATENT DOCUMENTS

| | | | | |
|---|---|---|---|---|
| 3,512,620 | A | 5/1970 | Bell et al. | |
| 3,731,859 | A | 5/1973 | Bean, Jr. | |
| 4,066,197 | A | 1/1978 | Nobbs et al. | |
| 6,705,234 | B1* | 3/2004 | Miller | A47B 3/087 108/115 |
| 2005/0241550 | A1* | 11/2005 | Neunzert | A47B 3/00 108/129 |
| 2010/0058958 | A1* | 3/2010 | Christian | A63B 67/06 108/19 |
| 2016/0270522 | A1* | 9/2016 | Winter | A47B 3/087 |
| 2019/0298054 | A1* | 10/2019 | Clegg | A47B 3/083 |

* cited by examiner

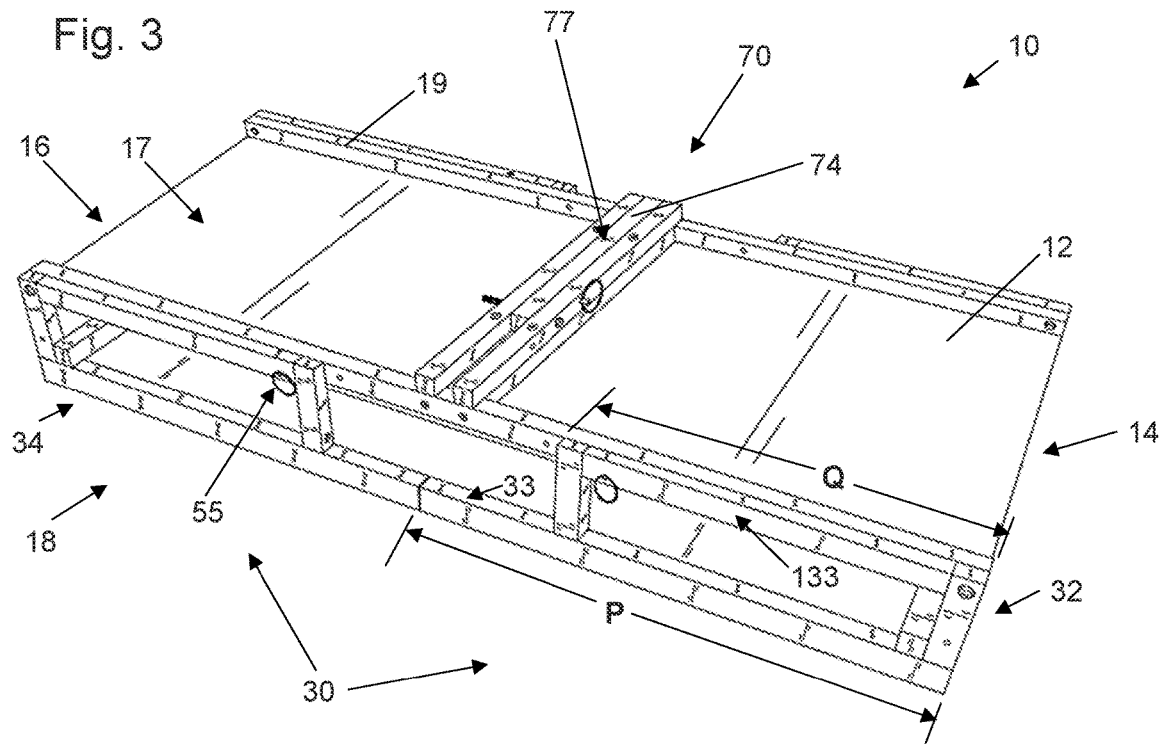
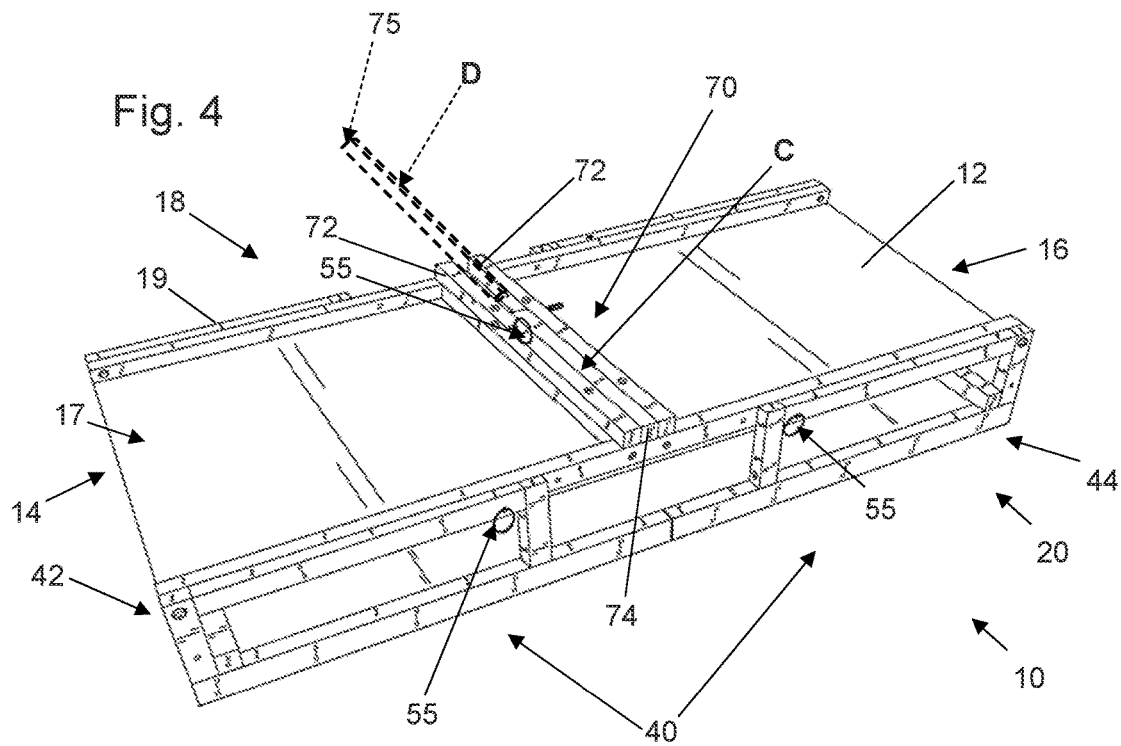

CONVERTIBLE CARRIER RACK AND PLATFORM

CROSS REFERENCE TO RELATED APPLICATIONS

The present application is a continuation of pending U.S. patent application Ser. No. 18/216,176, filed on Jun. 29, 2023, the disclosure of which is hereby incorporated herein in its entirety by reference.

TECHNICAL FIELD

The present disclosure relates to transportation, and more particularly to a convertible carrier rack and platform for use in travel and outdoor activities.

BACKGROUND AND SUMMARY

Vehicles for transportation have inherently limited cargo carrying capacity based on vehicle size and external cargo carrying ability. External cargo transport typically involves roof-mounted or trailer-mounted devices. Unfortunately, people desiring to participate in land-based travel to outdoor activity areas for camping, hiking, tailgating or other activities, are limited in how much gear can be transported safely and effectively to the desired activity area. For instance, it is often highly desirable to have a flat surface table-type device to use as a work area, a dining surface or other desired use. However, one cannot always bring such a desired object to the activity location due to space constraints, even with external cargo carrying ability.

Present technology solutions are focused on carrying cargo or creating a freestanding table style workspace, but not both. However, there is a need for efficiently transporting cargo external to a vehicle in such a way that the cargo carrying device can be converted into a freestanding table-type platform for use after the vehicle has arrived at the desired destination. Embodiments of the present disclosure solve the above problems by providing a single convertible apparatus operable as both a carrier rack and a platform.

The present disclosure relates to a device that can provide a user with both supplemental cargo carrying ability, and with a flat, stable workspace by use of the same device. This negates the need to carry multiple devices to achieve these distinctly different goals that are often both required in the same activity. The device can be employed in many applications, with a particular application as an automotive attachment to replace a roof or trailer cargo rack, where the cargo rack can be manipulated to function as a type of table.

Embodiments of the present disclosure include a flat surface with rails along all sides for the purpose of carrying cargo while attached to a vehicle, carried, or somehow otherwise transported. In various embodiments, the rails can pivot, rotate or detach and re-attach so as to convert to legs in order to form a table by use of the same flat surface. In various embodiments, the side rails can contact the bottom of the platform or a platform frame to provide support and stability to the device while in table configuration.

Various uses of the presently described device include camping, sporting events, construction/trades and other uses where a versatile, convertible cargo carrier and table may be employed.

BRIEF DESCRIPTION OF THE DRAWINGS

FIG. 3 is a right front bottom perspective view of the device of FIG. 1.

FIG. 4 is a left rear bottom perspective view of the device of FIG. 1.

DETAILED DESCRIPTION OF EMBODIMENTS

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

It will be appreciated that reference to "a", "an" or other indefinite article in the present disclosure encompasses one or a plurality of the described element. Thus, for example, reference to a rail segment may encompass one or more rail segments, reference to a connector may encompass one or more connectors and so forth.

Figure 1:
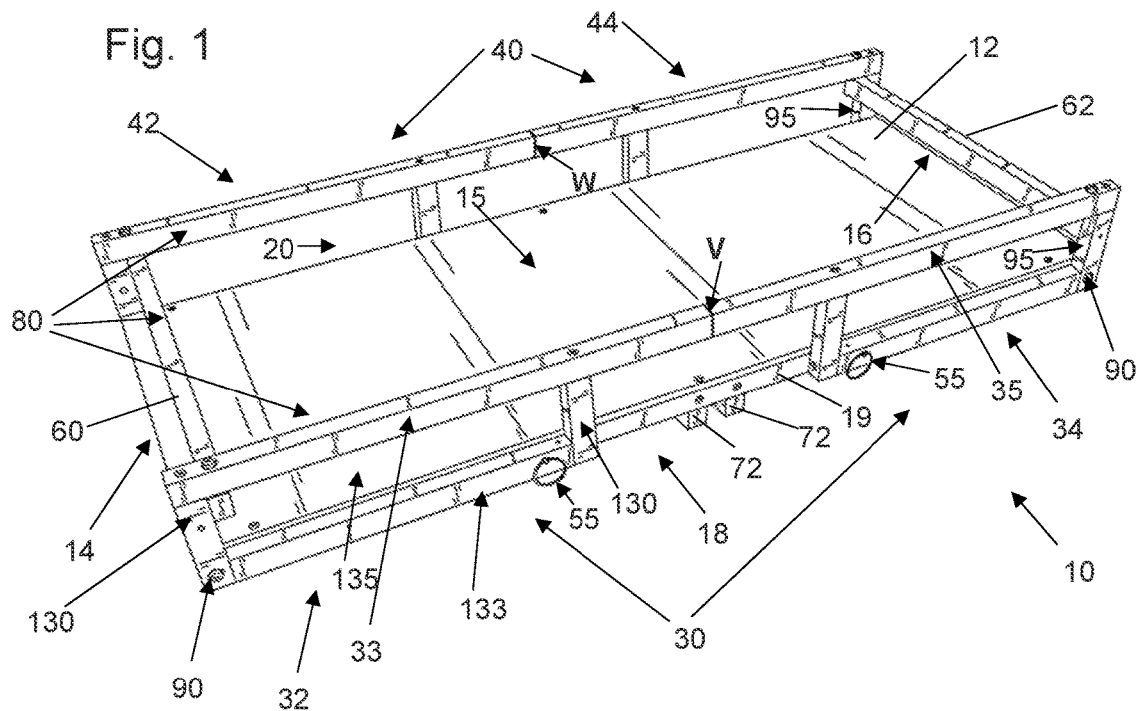
FIG. 1 is a left front top perspective view of a device according to embodiments of the present disclosure, wherein the rail segments are in the wall position.
Figure 2:
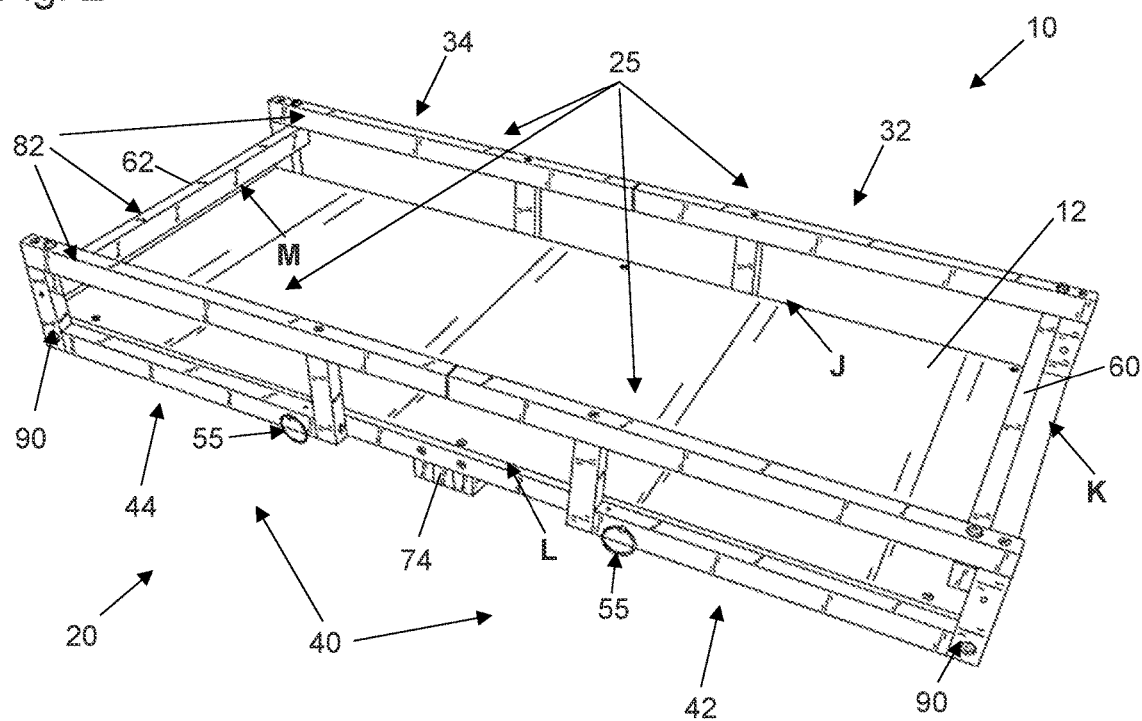
FIG. 2 is a right rear top perspective view of the device of FIG. 1.

As shown in FIGS. 1 through 8, embodiments of the device 10 include a platform 12 having a first end 14, a second end 16, a front face 18 and a back face 20. The platform 12 includes a planar upper surface 15 and a planar lower surface 17 and can include and/or be secured atop a platform frame 19. The planar upper surface 15 facilitates carrying of articles on a substantially flat, level surface during operation. The platform 12 has a perimeter formed by edge segments J, K, L and M, as shown in FIG. 2.

As further shown in FIGS. 1 through 8, the device 10 further includes a front rail 30 and a back rail 40. The front rail 30 includes a first front rail segment 32 and a second front rail segment 34. The first front rail segment 32 can be rotatably and/or removably secured to the platform 12 proximate the first end 14 of the platform 12, and the second front rail segment 34 can be rotatably and/or removably secured to the platform 12 proximate the second end 16 of the platform 12. The back rail 40 includes a first back rail segment 42 and a second back rail segment 44. The first back rail segment 42 can be rotatably and/or removably secured to the platform 12 proximate the first end 14 of the platform 12, and the second back rail segment 44 can be rotatably and/or removably secured to the platform 12 proximate the second end 16 of the platform 12. Rotation of these elements can be provided using a rod or pin 90 inserted through the element into the platform frame 19, as shown in FIGS. 1 and 2, for example. It will be appreciated that the first 32 and second 34 front rail segments and the first 42 and second 44 back rail segments can be rotatable between a wall position shown generally at 25 in FIG. 2 along the front 18 and back 20 faces, respectively, of the platform 12 and a leg position shown generally at 28 in FIG. 8, where the first front rail segment 32 and the first back rail segment 42 are proximate the first end 14 of the platform 12 and where the second front rail segment 34 and the second back rail segment 44 are proximate the second end 16 of the platform 12.

Figure 5:
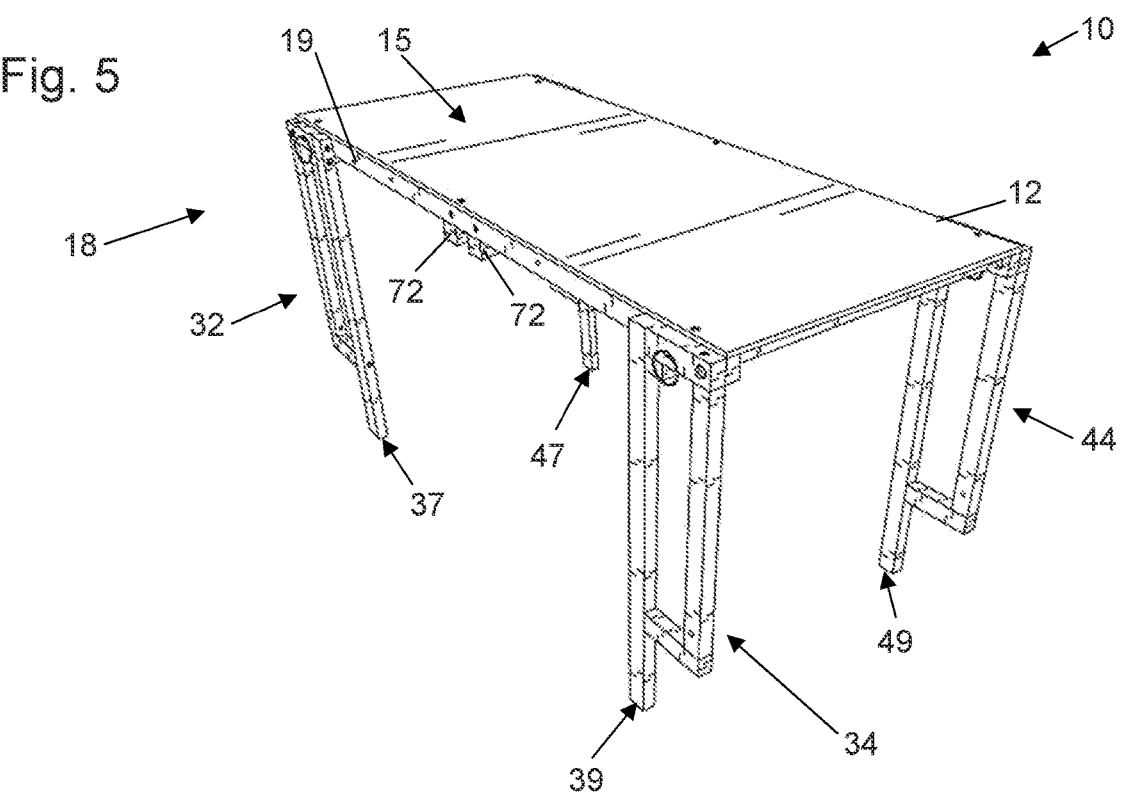
FIG. 5 is a right front top perspective view of a device according to embodiments of the present disclosure, wherein the rail segments are in the leg position.
Figure 6:
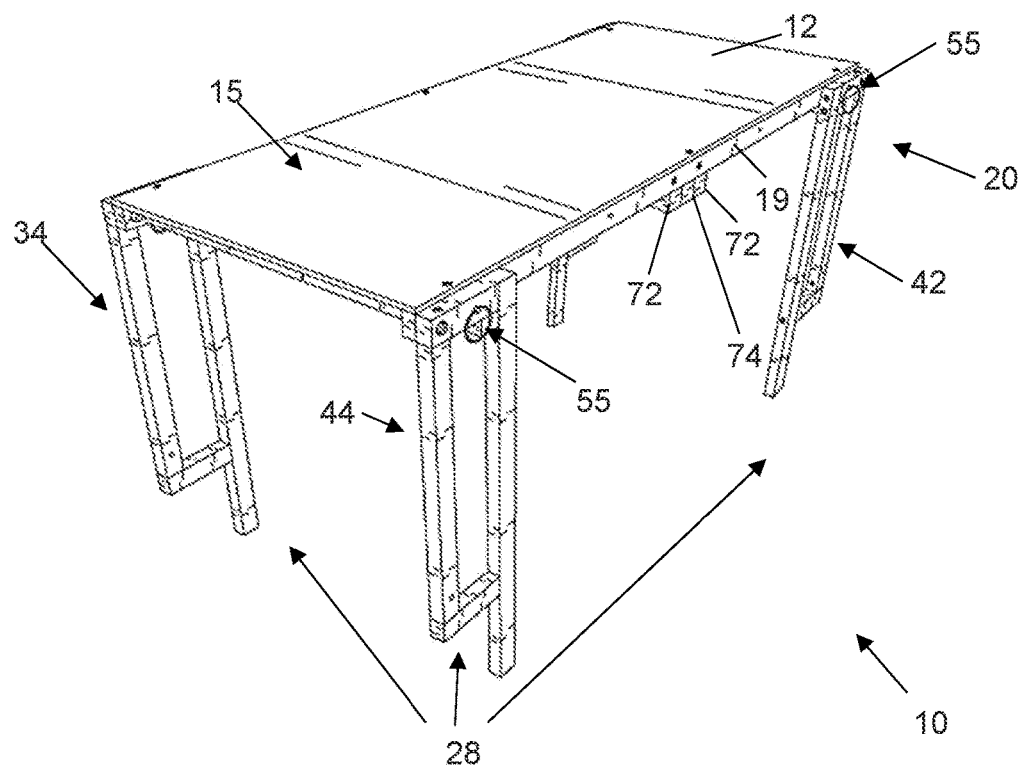
FIG. 6 is a left rear top perspective view of the device of FIG. 5.
Figure 7:
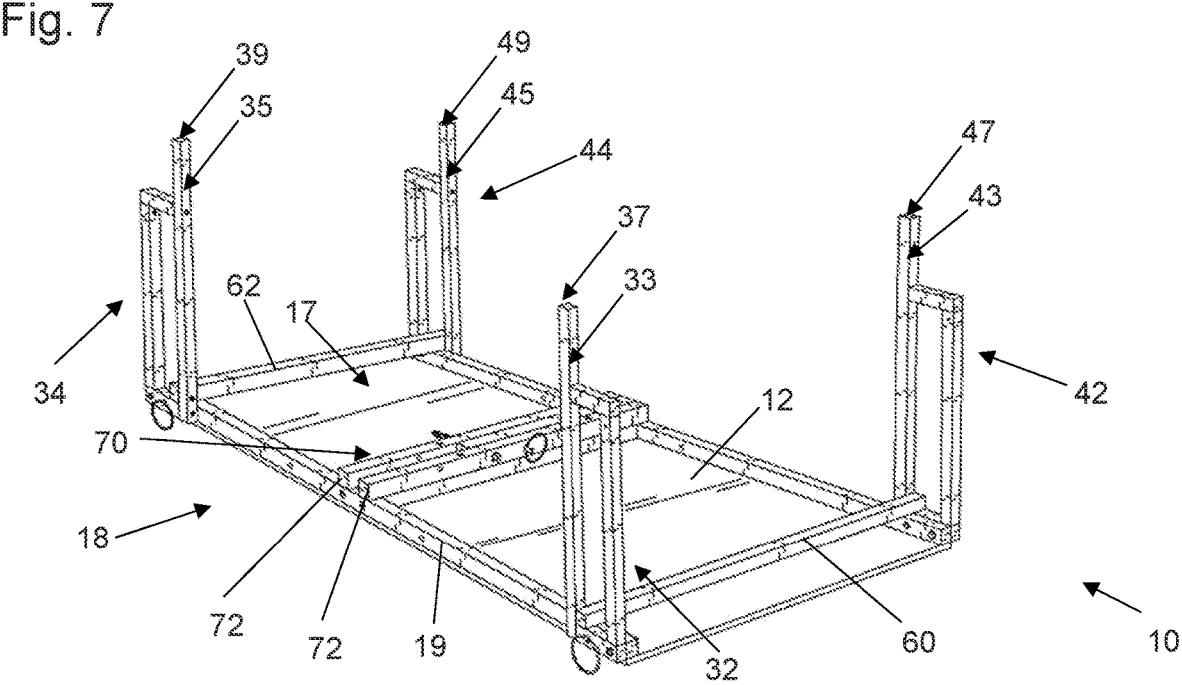
FIG. 7 is a right front bottom perspective view of the device of FIG. 5.

In various embodiments such as shown in FIG. 7, for example, each of the front 32, 34 rail segments includes a longitudinal segment 33, 35, respectively, having a respective rail segment edge 37, 39. Similarly, each of the back 42, 44 rail segments includes a respective longitudinal segment 43, 45 having a respective back rail segment edge 47, 49. As shown at area V in FIG. 1, the first front rail segment edge 37 abuts the second front rail segment edge 39 in the wall position 25, and as shown at area W in FIG. 1, the first back rail segment edge 47 abuts the second back rail segment edge 49 in the wall position 25. As shown in FIGS. 5 and 7, edges 37, 39, 47, 49 act as bottom surface points that can engage a floor, the ground or another flat surface in the leg position 28. According to various embodiments, each of the front rail segments 32, 34 has at least two front rail longitudinal segments secured to one or more front rail brace segments. For example, front rail segment 32 can include an upper front rail longitudinal segment 33, a lower front rail longitudinal segment 133 and one or more front rail brace segments 130. The front rail brace segment 130 connects segments 33 and 133 for stability and to provide an additional barrier to cargo slippage when the front rail segment 32 is in the wall position 25. It will be appreciated that the front rail longitudinal segments 33, 133 can be arranged to be substantially parallel for ease of operation, with the gap 135 between the segments 33, 133 creating space for manual handling of the device 10. In various embodiments such as shown in FIG. 3, for example, longitudinal segment 33 has a length P that is longer than length Q of longitudinal segment 133. This contributes to overall function and compactness of the device 10, for example, as the longitudinal segment 133 does not block access to, or operation of, an optional hitch connector assembly 70 as described elsewhere herein. As shown in FIGS. 1 through 8, the arrangement of segments 33, 133 and 130 with regard to the front rail segment 32 can be repeated for front rail segment 34 and back rail segments 42, 44. Providing the rail segments 32, 34, 42, 44 with two or more longitudinal segments (e.g., 33 and 133) separated by a gap (e.g., 135) further provides a device 10 of lighter weight for transportation and portability advantages. It will be appreciated that segments 33 and 133 can be of the same length, and it will be further appreciated that segment 33 can be shorter than segment 133 in different embodiments of the present disclosure.

Figure 8:
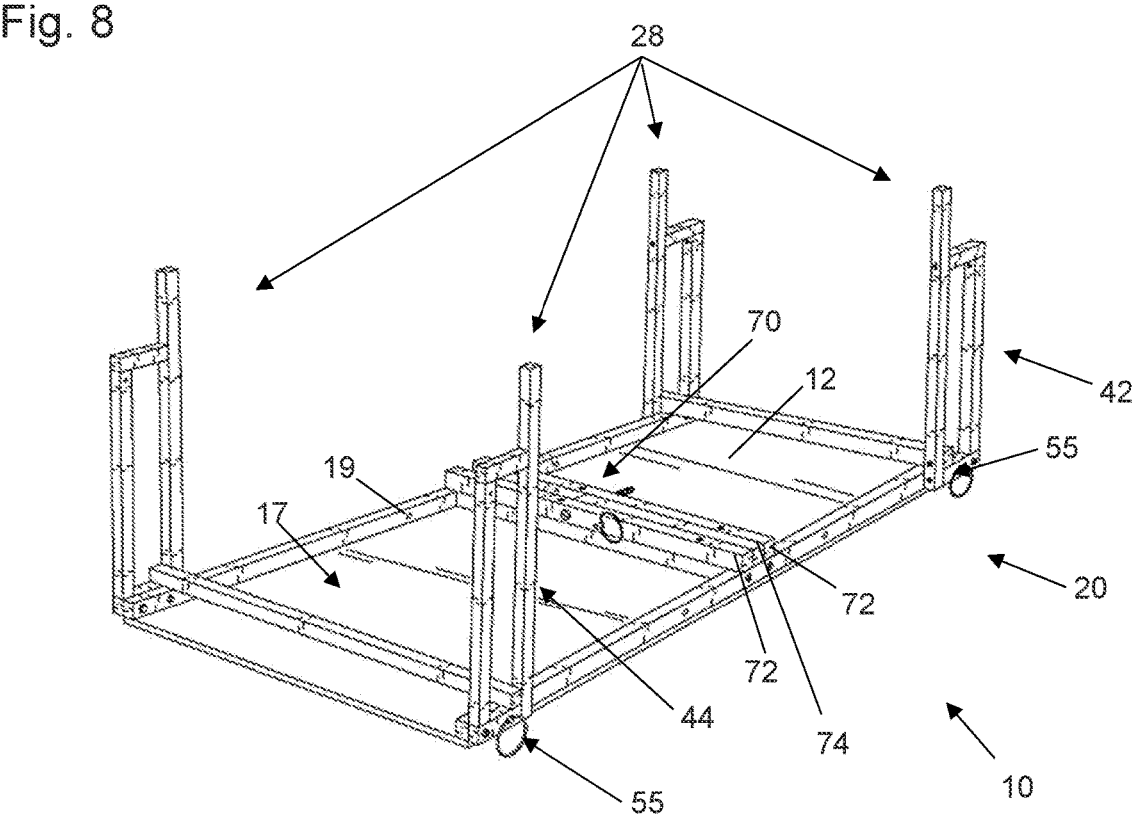
FIG. 8 is a left rear bottom perspective view of the device of FIG. 5.

As shown in FIGS. 2 and 8, it will be appreciated that the wall position 25 can be substantially perpendicular to the leg position 28, which facilitates both sturdiness of the device 10 in the leg position 28 and compactness of the device 10 in the wall position 25. In various embodiments such as shown in FIGS. 2, 6 and 8, for example, the first 32 and second 34 front rail segments and the first 42 and second 44 back rail segments are securable to the platform 12 in the wall position 25 and/or the leg position 28 via one or more connector elements 55. The connector elements 55 may extend through a longitudinal segment (e.g., 133 in FIG. 1) or through a brace segment (e.g., 130 in FIG. 1) of the various rail segments 32, 34, 42, 44. The connector elements 55 can be embodied in many forms, including, without limitation, a cotter pin, a spring-loaded detent, a cylindrical pin with a ring for insertion of a finger or other item, a latch and hook, magnets, clips and other similar attachment mechanisms. In embodiments where the connector element 55 is a cylindrical pin, the pin can extend through openings formed in two or more elements such as rail segments 32, 34, 42, 44 and platform 12 or platform frame 19. to create a securing link.

As shown in FIGS. 1, 2 and 7, in various embodiments, side rails 60, 62 can be secured between respective front rail and back rail segments. Side rails 60 and 62 provide an upper wall barrier at the respective ends 14, 16 of the platform 12 to restrict cargo from sliding off of the upper surface 15 of the platform 12. Side rail 60 can be secured between the first front rail segment 32 and the first back rail segment 42 and side rail 62 can be secured between the second front rail segment 34 and the second back rail segment 44. According to various embodiments, the side rails 60, 62 are not aligned with the perimeter edge segments K, M of the platform 12 but are positioned inwardly more toward the center of the platform 12, and are thus mounted on an interior edge 95 of rail segments 32, 34, 42, 44, which can assist in positioning against the platform frame 19 during operation in the leg position 28 as described elsewhere herein. The joined combination of the side rail 60 with the first front rail segment 32 and the first back rail segment 42 forms a perimeter wall 80, and the joined combination of the side rail 62 with the second front rail segment 34 and the second back rail segment 44 forms another perimeter wall 82. The perimeter walls 80, 82 can be rotatably secured to the platform frame 19 so as to be rotatable from the wall position 25 proximate perimeter segments K and M, respectively of the platform to the leg position 28 whereby each of the side rails 60, 62 engages the bottom surface 17 of the platform 12 and/or the platform frame 19. Engagement of the side rails 60 and 62 with the bottom surface 17 of the platform 12 and/or the platform frame 19 when the rail segments are in the leg position 28 provide additional stability and a natural stopping point of rotation for the rail segments 32, 34, 42, 44 during operation.

In various other embodiments, side rails 60, 62 can be secured to the outside edge of the rail segments 32, 34, 42, 44. In still further embodiments, additional side rails or transverse rails can be secured to or between rail segment pairs 32, 42 and 34, 44 for added stability and cargo securement. For example, a transverse rail (not shown), may extend closer to the center of the platform 12 such as from a position above front rail brace segment 130 on front rail segment 32 to a position above the counter front rail brace segment of back rail segment 42 in FIG. 1.

As shown in FIGS. 1 and 2, according to various embodiments, the first front rail segment 32 and the first back rail segment 42 are rotatable at least 270 degrees about a first pivot axis generally aligned with perimeter edge segment K and/or the first end 14 of the platform 12, and the second front rail segment 34 and the second back rail segment 44 are rotatable at least 270 degrees about a second pivot axis generally aligned with perimeter edge segment M and/or the second end 16 of the platform 12. In various embodiments, the range of rotation is greater than 270 degrees, which can, for example, permit the rail segments 32, 34, 42, 44 to rotate past a parallel position with the platform 12 to a position where side rails 60, 62 engage the platform upper surface 15 as a form of stop position for the rail segments 32, 34, 42, 44. In still other embodiments, the range of rotation is less than 270 degrees to accommodate a leg position 28 that may not be perpendicular to the wall position 25. Such an arrangement may provide a wider stance for the leg position 28 that may contribute to a particularly desirable stability in certain embodiments, for example.

As shown in FIGS. 1 through 8, in various embodiments, a hitch connector assembly 70 is secured to the platform 12 and/or the platform frame 19. The hitch connector assembly 70 can include one or more support beams 72 and a hitch connector 74 that is movable with respect to the one or more support beams 72. In various embodiments, the hitch connector 74 is pivotably secured to the one or more support beams 72 so as to be capable of extending outwardly of the front face 18 of the device 10 when in an extended position 75 so as to be securable to a vehicle trailer receiver tube, for example. When not in use with a vehicle trailer, the hitch connector 74 can be moved back to a retracted position as at 77 where the hitch connector 74 no longer extends outwardly of the front face 18. In embodiments with a pivot connection, the hitch connector 74 may pivot around a rod 80 inserted through the one or more support beams 72 and the hitch connector 74. Alternatively, the hitch connector 74 may be secured to and pivot in relation to the platform 12. The hitch connector 74 can also be secured in the extended 75 and/or retracted 77 positions via a connector element 55 as described elsewhere herein. In various embodiments such as shown in FIG. 4, for example, the platform frame 19 extends along a platform frame plane, and the hitch connector 74 is pivotable between a first position C and a second position D (shown in dashed lines) aligned with the platform frame plane, wherein the first position C extends interiorly of the platform frame 19 and wherein the second position D extends exteriorly of the platform frame 19 beyond the front face 18 of the platform 12. It will be appreciated that the first position C can correspond to the retracted position 77 and the second position D can correspond to the extended position 75, as shown in FIGS. 3 and 4.

In various embodiments, the hitch connector 74 is not pivotably secured to the one or more support beams 72 but is rather slidably or telescopically secured to the one or more support beams 72. The slidable operation can be provided via a retaining floor (not shown) maintaining the hitch connector 74 in longitudinal alignment with the one or more support beams 72, where the hitch connector 74 may be secured in the retracted 77 or extended 75 position via a connector element 55. Other embodiments of the hitch connector 74 can include, for example, a nested set of sliding tubular members that permit telescopic operation of the hitch connector 74 as it moves between extended 75 and retracted 77 positions. The hitch connector 74 can also be movably secured to the platform 12 and/or the platform frame 19 in the sense that it is removable and then re-securable in different positions depending upon whether it is being employed with a trailer receiver tube of a vehicle or stored within the frame of the platform for use as a table or work area, for example.

In operation, the device 10 can be employed as a vehicle roof rack where the hitch connector 74 is in the retracted position and the rail segments 32, 34, 42, 44 are in the wall position 25. The rail segments 32, 34, 42, 44 can be positioned such that edges 37 and 39 are in mating contact as at V in FIG. 1 and edges 47 and 49 are in mating contact as at W in FIG. 1. Connector elements 55 can then be employed to secure the rail segments 32, 34, 42, 44 in place, and these connector elements can be positioned through one or more elements of each rail segment 32, 34, 42, 44 as described elsewhere herein. Should it be desired to employ the device in connection with a trailer receiver tube of a vehicle, the hitch connector 74 can be moved to the extended position (C in FIG. 4) as described herein, and secured in place using a connector member 55.

When the device 10 is to be employed as a flat surface, table-type device, the connector members 55 can be disconnected. If the hitch connector 74 is in the extended position C, it can be moved to the retracted position D. Otherwise, the rail segments 32, 34, 42 and 44 can be moved to the leg position 28, whereupon the side rails 60, 62 can matingly engage the platform lower surface 17 and/or the platform frame 19. The rail segments 32, 34, 42, 44 can then be further secured in place using connector elements as described elsewhere herein.

It will be appreciated that the components of the presently disclosed device can be fabricated from various types of materials, including aluminum, steel, carbon fiber, plastic and/or other suitable materials consistent with the transportation and recreational environments in which the device can operate.

Embodiments of the present disclosure may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:
1. An apparatus, comprising:
a support frame;
a platform secured atop the support frame, wherein the platform comprises a perimeter, a first end, a second end, a front face and a back face;
a first front rail segment and a first back rail segment joined by a first side rail to form a first perimeter wall; and
wherein the first perimeter wall is secured to the support frame so as to be rotatable with respect to the support frame from a wall position proximate a first portion of the perimeter of the platform to a leg position whereby the first side rail engages the support frame.

* * * * *